US012800456B2

(12) United States Patent
Kim et al.

(10) Patent No.: US 12,800,456 B2
(45) Date of Patent: Nov. 17, 2026

(54) APPARATUS FOR TESTING THE DEGREE OF PEELING OF ELECTRODE ACTIVE MATERIAL

(71) Applicant: LG Energy Solution, Ltd., Seoul (KR)

(72) Inventors: Byeongjo Kim, Daejeon (KR); Sung Kyum Kim, Daejeon (KR); Tae Gyun Yoon, Daejeon (KR); Sang Hoon Choy, Daejeon (KR); Jeong Soo Seol, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 154 days.

(21) Appl. No.: 18/846,390

(22) PCT Filed: Sep. 19, 2023

(86) PCT No.: PCT/KR2023/014176

§ 371 (c)(1),
(2) Date: Sep. 12, 2024

(87) PCT Pub. No.: WO2024/085472

PCT Pub. Date: Apr. 25, 2024

(65) Prior Publication Data

US 2025/0208013 A1 Jun. 26, 2025

(30) Foreign Application Priority Data

Oct. 19, 2022 (KR) ........................ 10-2022-0134889

(51) Int. Cl.
*G01N 3/06* (2006.01)

(52) U.S. Cl.
CPC ..... *G01N 3/068* (2013.01); *G01N 2203/0091* (2013.01)

(58) Field of Classification Search
CPC ........... G01N 3/068; G01N 2203/0091; G01N 2203/00; G01N 19/04
See application file for complete search history.

(56) References Cited

U.S. PATENT DOCUMENTS 12,265,018 B2 * 4/2025 Sim .......................... G01N 1/36
2020/0354178 A1 11/2020 Abe et al.
(Continued)

FOREIGN PATENT DOCUMENTS

CN 216051318 U 3/2022
CN 114544486 A 5/2022
(Continued)

OTHER PUBLICATIONS

Extended European Search Report including Written Opinion for Application No. 23880051.0 dated Jul. 17, 2025, pp. 1-9.
(Continued)

*Primary Examiner* — Kristina M Deherrera
*Assistant Examiner* — Jean F Morello
(74) *Attorney, Agent, or Firm* — Lerner David LLP

(57) ABSTRACT

An apparatus for automatically testing the degree of secession of an electrode active material according includes a tape providing member, a tape adhesive member, and a testing the unit. The tape providing member provides a tape and the tape adhesive member presses the tape so that the tape adheres to the electrode. The testing unit tests the degree of peeling of the active material of the electrode when the electrode and the tape are pressed by the tape adhesive member and then separated from each other, thereby causing peeling of the active material of the electrode.

20 Claims, 7 Drawing Sheets

(56) References Cited

U.S. PATENT DOCUMENTS

| | | | | |
|---|---|---|---|---|
| 2021/0080377 | A1* | 3/2021 | Wang | G01N 3/08 |
| 2024/0175792 | A1* | 5/2024 | Oh | G01N 19/04 |

FOREIGN PATENT DOCUMENTS

| | | | |
|---|---|---|---|
| JP | 2005283484 | A | 10/2005 |
| JP | 2012243511 | A | 12/2012 |
| JP | 2014135270 | A | 7/2014 |
| JP | 2020024885 | A | 2/2020 |
| JP | 2020183312 | A | 11/2020 |
| JP | 2021148482 | A | 9/2021 |
| KR | 20060104746 | A | 10/2006 |
| KR | 101719031 | B1 | 3/2017 |
| KR | 20170068977 | A | 6/2017 |
| KR | 102045718 | B1 | 11/2019 |
| KR | 20210123792 | A | 10/2021 |
| KR | 20220011318 | A | 1/2022 |
| KR | 20220050451 | A | 4/2022 |
| KR | 20220060837 | A | 5/2022 |
| KR | 20220121029 | A | 8/2022 |

OTHER PUBLICATIONS

International Search Report for PCT/KR2023/014176 mailed Dec. 29, 2023. 3 pages.

* cited by examiner

【FIG. 1】
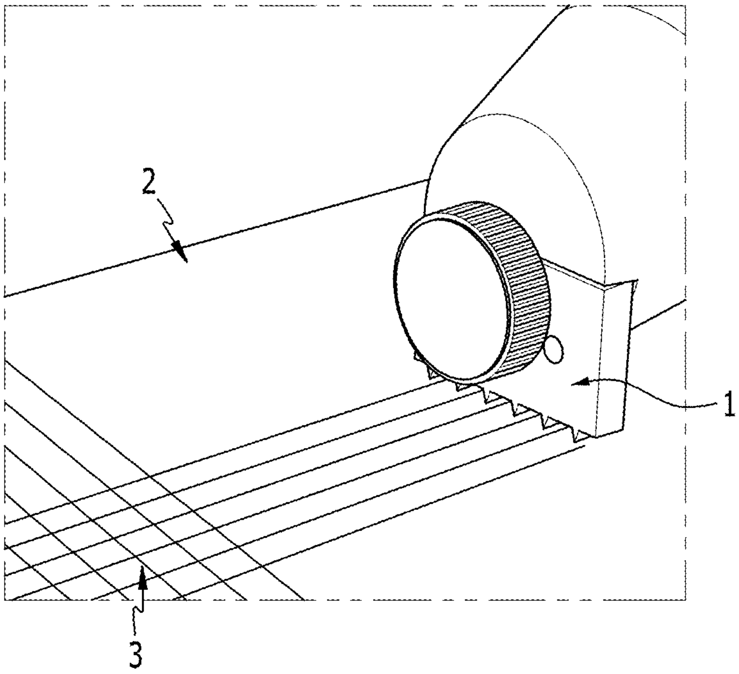
PRIOR ART
【FIG. 2】
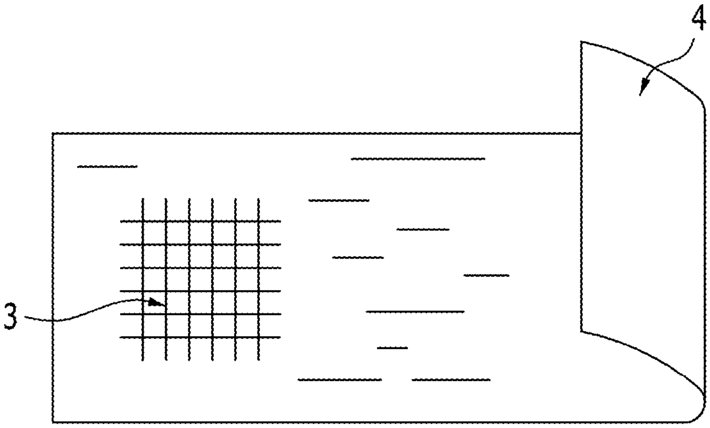
PRIOR ART

【FIG. 3】

| Classification | | Description | Examples of surface conditions after peeling test |
|---|---|---|---|
| ISO | ASTM | | |
| 0 | 5B | The cut surface is clean and the squares were not separated. | 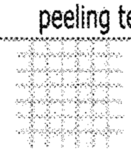 |
| 1 | 4B | Small pieces of the coating separate at the intersection;<br>Less than 5% of grid area | 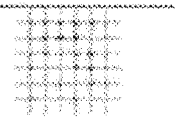 |
| 2 | 3B | Small pieces of the coating are separated along the edge and at the intersection of the cut parts;<br>5~15% of grid area | 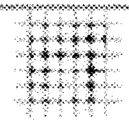 |
| 3 | 2B | The cut edge of the coating and part of the square are separated;<br>15~35% of grid area | 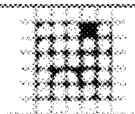 |
| 4 | 1B | The coating was peeled off significantly along the edges of the cut surface and the square was separated;<br>35~65% of grid area | 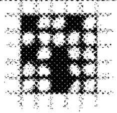 |
| 5 | 0B | Was more peeled and separated than 1B;<br>65% or more of grid area | 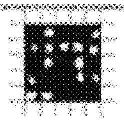 |

PRIOR ART

【FIG. 4】
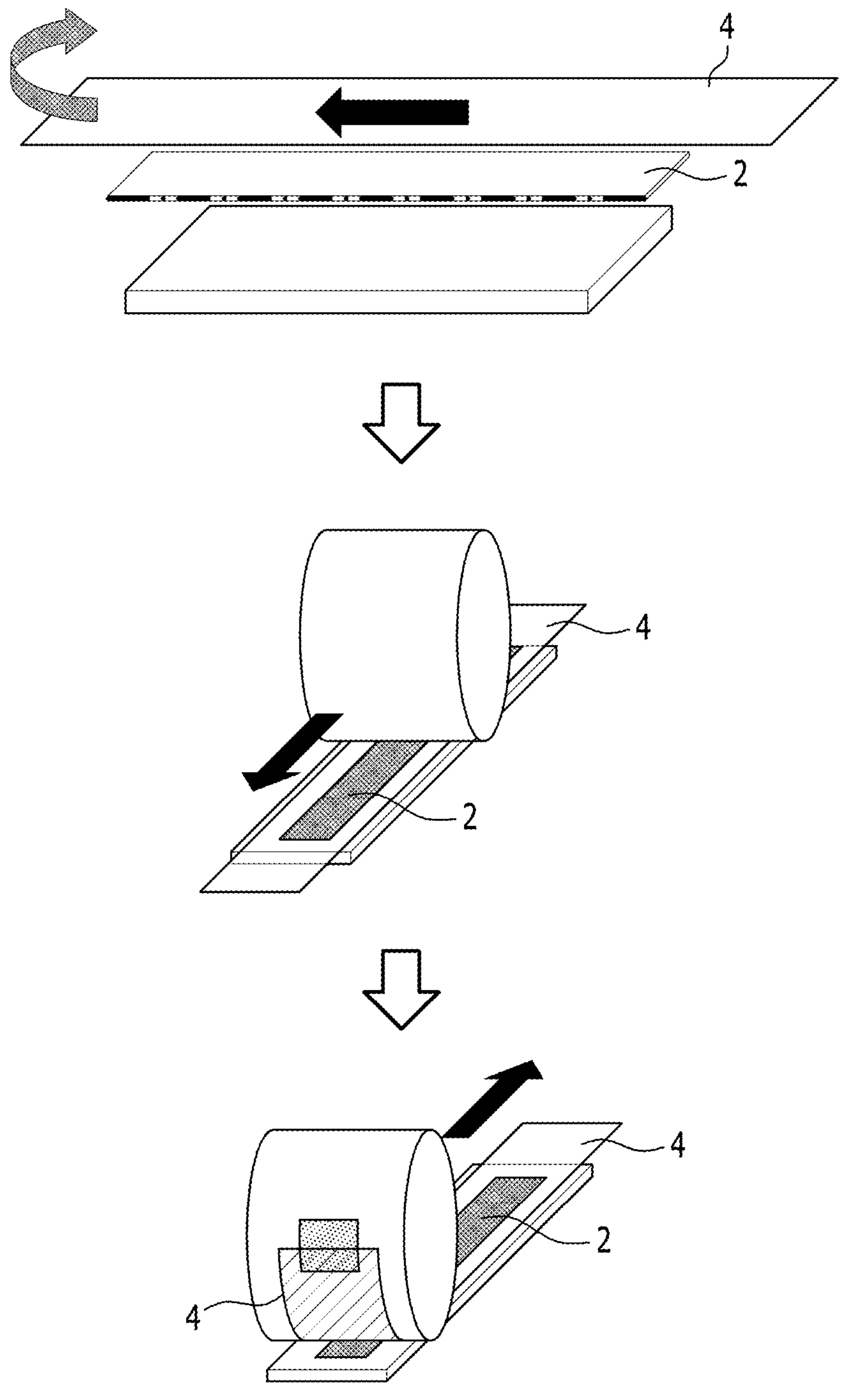
PRIOR ART

【FIG. 5】
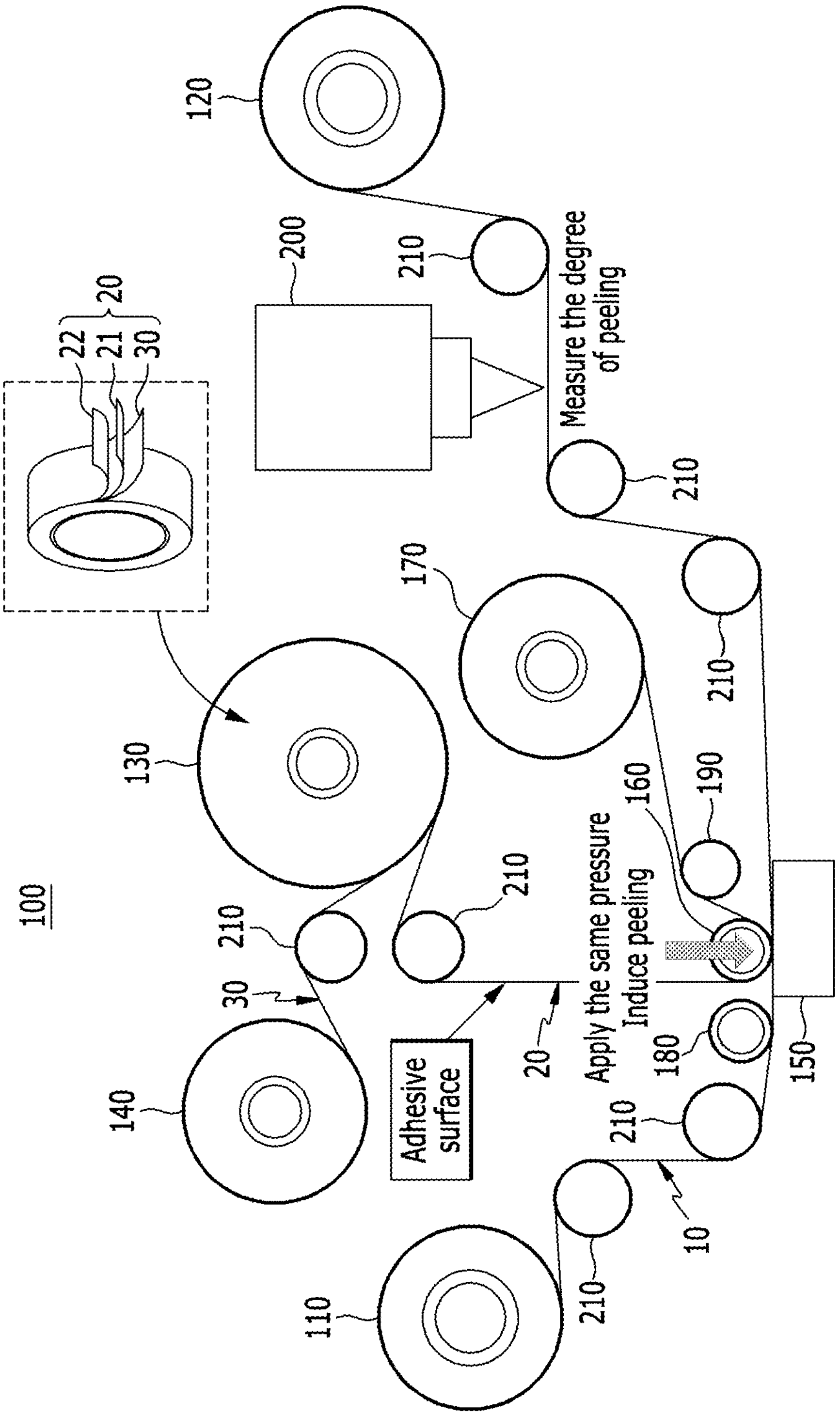

【FIG. 6】
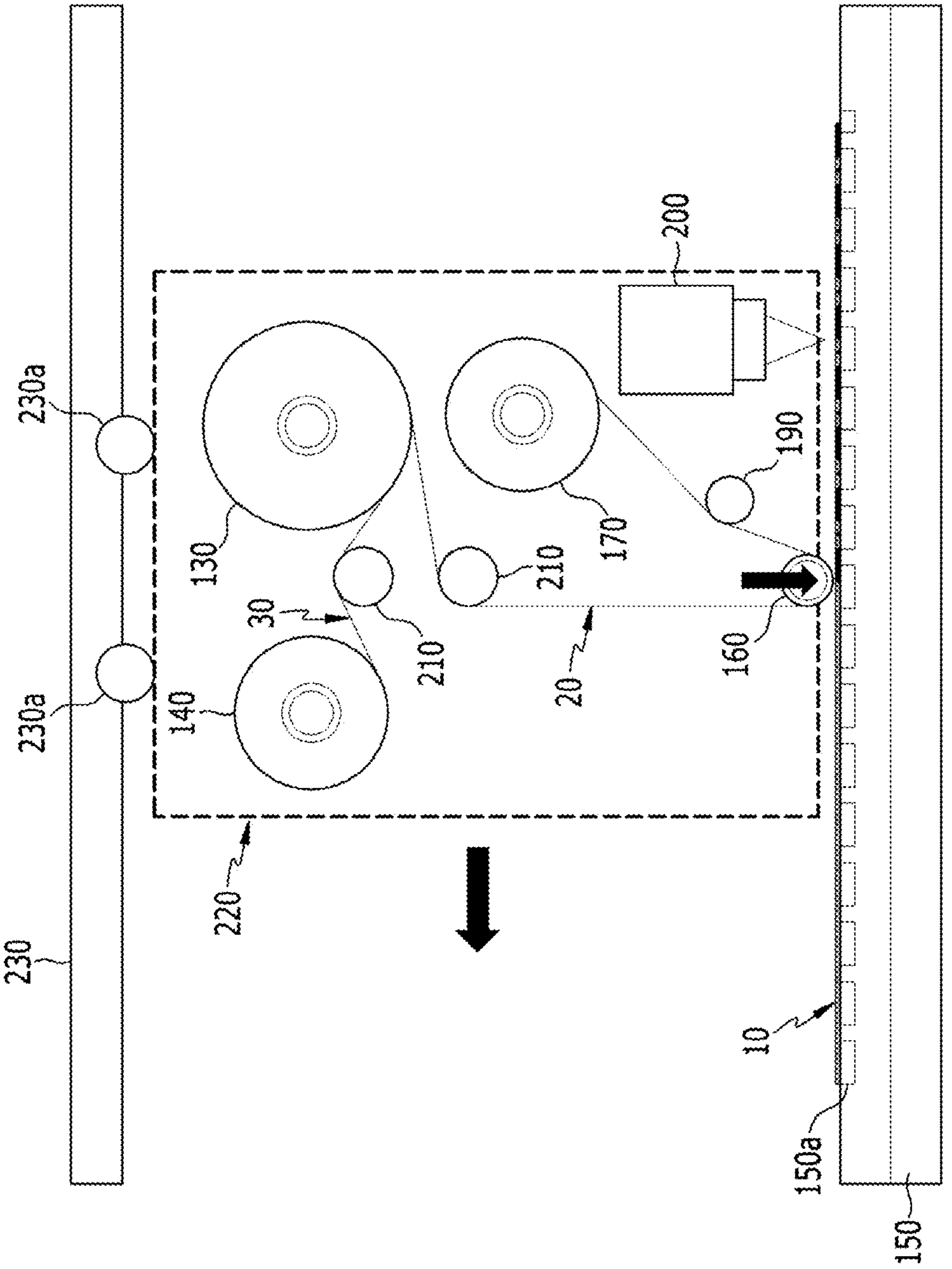

【FIG. 8】
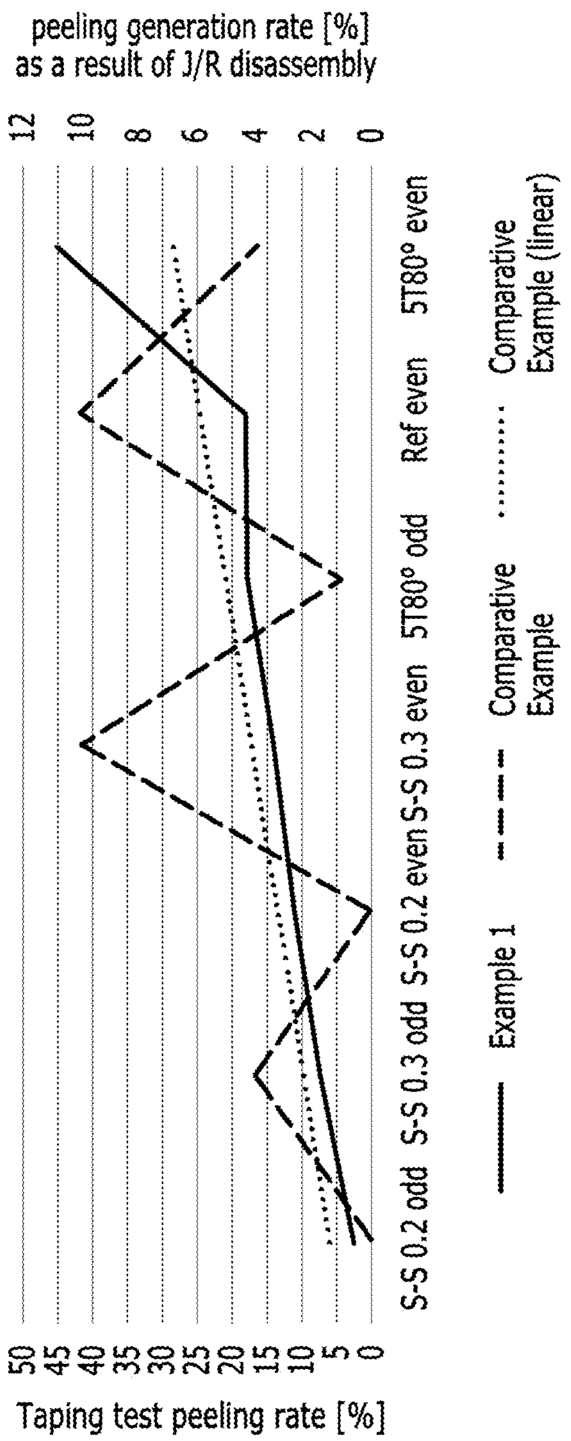

APPARATUS FOR TESTING THE DEGREE OF PEELING OF ELECTRODE ACTIVE MATERIAL

CROSS-REFERENCE TO RELATED APPLICATION(S)

The present application is a national phase entry under 35 U.S.C. § 371 of International Application No. PCT/KR2023/014176, filed on Sep. 19, 2023, which claims priority from Korean Patent Application No. 10-2022-0134889, filed on Oct. 19, 2022, all of which are incorporated herein by reference.

TECHNICAL FIELD

The present disclosure relates to an apparatus for testing the degree of peeling of electrode active materials, and more particularly, to an apparatus that can automatically perform the electrode active material peeling testing.

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, along with the increase of the technological development and demand for mobile devices such as portable computers, portable phones, and cameras, the demand for secondary batteries has also sharply increased as an energy source. Among such secondary batteries is a lithium secondary battery exhibiting high energy density and operating potential, a long cycle lifespan, and a low self-discharge rate, in which much research has been carried out and which is now commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Such a lithium secondary battery is manufactured by embedding an electrode assembly together with an electrolyte in a battery case, wherein the electrode assembly is obtained by coating a positive electrode or a negative electrode active material, a binder and a conductive material in the form of a slurry on a current collector and drying them to form an electrode mixture layer, thereby manufacturing a positive electrode and a negative electrode, interposing a separator between the positive electrode and the negative electrode, and then laminating them.

The electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound with a separator being disposed therebetween, or a stacked type electrode assembly configured to have a structure in which a plurality of positive electrodes having a predetermined size and a plurality of negative electrodes having a predetermined size are sequentially stacked with separators being interposed therebetween.

As an electrode assembly with an improved structure, which is a combination of the jelly-roll type electrode assembly and the stacked type electrode assembly, a stacked/folded type electrode assembly has been developed. The stacked/folded type electrode assembly is configured to have a structure in which a plurality of full cells, each of which has a certain unit size and is configured to have a positive electrode/separator/negative electrode structure, or a plurality of bicells, each of which has a certain unit size and is configured to have a positive electrode (negative electrode)/separator/negative electrode (positive electrode)/separator/positive electrode (negative electrode) structure, are folded using a long continuous separation film.

In addition, in order to improve the processability of a conventional stacked type electrode assembly and to satisfy the demand for various kinds of secondary batteries, there also has been developed a laminated/stacked type electrode assembly configured to stack unit cells in which the electrodes and the separators are alternately laminated and joined.

In order to quantitatively analyze the quality of the electrode manufactured in the electrode manufacturing process of such a secondary battery, for example, a slitting process, the peeling area of the active material of the electrode is calculated.

According to the prior art, there is an international standard method for tape testing (ASTM D3359, ISO 2409). Referring to FIGS. 1 to 3 according to the prior art, in the case of the international standard method, cuts are made artificially, the surface is peeled off with tape, and the degree of adhesion of the coating film is determined by five levels.

More specifically, (1.) Select a blade 1 according to the required standard and make a grid pattern 3 on the coated surface 2. At this time, the blade 1 must penetrate the coating surface 2 and come into contact with the material surface located below the coating surface 2 (see FIG. 1). (2.) Remove the residue of coating fragments using methods specified in international standards. (3.) If the material is hard, place the adhesion test tape 4 in parallel onto the grid pattern and then detach the tape 4 evenly within 5 minutes at a 60 degree angle (ISO standard) or within 90 seconds (±30 seconds) at a 180 degree angle within 0.5 seconds to 1 second (see FIG. 2). (4). Check the shape of the position where the coating has detached using a magnifying glass or microscope. (5.) At this time, the degree of peeling is compared with the 5-level index (see FIG. 3) and visually determined by a person using a magnifying glass, microscope or the like. Therefore, there is a problem that the quality of the electrode (e.g., the degree of peeling of the active material of the electrode) cannot be quantified.

Further, referring to FIG. 4 according to the prior art, in the case of the electrode production process, because the size of the peeling region is very fine, a large difference in the degree of peeling occurs even if there is a slight deviation in the compression pressure of the tape, the angle and speed of tape peeling, etc. during the experimental stage. Therefore, the range of error in the test results of the quality of the electrode (e.g., the degree of peeling of the active material of the electrode) is large, resulting in a problem in that the reliability of the test decreases.

Technical Problem

It is an object of the present disclosure to improve a conventional apparatus for testing the degree of peeling of an electrode active material so as to improve manufacturing efficiency and product quality.

However, the technical problems to be solved by embodiments of the present disclosure are not limited to the above-described problems, and can be variously expanded within the scope of the technical idea included in the present disclosure.

Technical Solution

According to one embodiment of the present disclosure, there is provided an apparatus for automatically testing the degree of peeling of an electrode active material, the apparatus comprising: a tape providing member that provides a tape; a tape adhesive member that presses the tape so that the tape adheres to the electrode; and a testing unit that tests the degree of peeling of the active material of the electrode, wherein the electrode and the tape are pressed by the tape adhesive member and then separated from each other, thereby causing peeling of the active material of the electrode.

The testing unit tests the degree of peeling of the electrode active material based on a ratio of the peeling region to the measurement region, the measurement region is a region where the surface of the electrode on which the peeling is generated is specified with a predetermined horizontal length and a predetermined vertical length, and the peeling region may be a region where the electrode active material is seceded and the electrode foil is exposed.

The testing unit may test the degree of peeling of the electrode active material based on a ratio of the area of the peeling region to the area of the measurement region.

The measurement region includes a plurality of sub-regions that are respectively divided at regular intervals in the horizontal and vertical directions and formed in a grid shape, and the testing unit may test the degree of peeling of the electrode active material based on a ratio of the number of sub-regions where peeling is generated to the total number of sub-regions.

The testing unit may be configured such that among a plurality of sub-regions: a chromaticity of the surface of the sub-region of the electrode falls within a range of a preset value; or a brightness of the surface of the sub-region of the electrode is greater than a preset value; or if the height of the sub-region of the electrode is smaller than a preset value, the sub-region may be set as a peeling sub-region.

The testing unit may be configured such that: the chromaticity of the surface of the electrode falls within a range of preset values; or the brightness of the surface of the electrode is greater than a preset value; or if the height of the electrode is smaller than a preset value, it may be recognized that the peeling has occurred.

The testing unit may calculate the degree of peeling of the electrode active material as a score or grade.

The testing apparatus further comprises: a tape recovery member for recovering the tape that has passed through the tape pressing unit; and a release paper recovery member that recovers the release paper separated from the adhesive surface of the tape, wherein when the tape is provided from the tape providing member, the release paper is separated from the adhesive surface of the tape.

The tape providing member is a tape unwinder that unwinds the wound tape, the tape recovery member is a tape rewinder that rewinds the tape, and the release paper recovery member may be a release paper rewinder that rewinds the release paper.

The testing apparatus may further comprise an electrode providing member that provides the electrode; and an electrode recovery member for recovering the electrode that has passed through the testing unit.

The electrode may be provided in a roll type.

The electrode providing member may be an electrode unwinder that unwinds the wound electrode, and the electrode recovery member may be an electrode rewinder that rewinds the electrode.

The testing apparatus may further comprise a table on which the electrode is placed and which supports the electrode.

The electrode is provided in a sheet type, the tape adhesive member moves while pressing the surface of the sheet-type electrode to thereby induce peeling of the active material of the electrode, and subsequently, the testing unit may test the degree of peeling of the active material of the electrode while passing on the sheet-type electrode.

The testing apparatus may further comprise: a moving box that houses the tape adhesive member and moves on the electrode; and a driving unit that moves the moving box, wherein the testing unit is provided at the rear end of the moving box and moves on the electrode; or is provided separately from the moving box and may move over the electrode following movement of the moving box.

The table may include a suction member capable of sucking the sheet-type electrode onto the table, and the suction member may include at least one suction port.

The moving box may further house: a tape providing member; a tape recovery member for recovering the tape that has passed through the tape pressing unit; and a release paper recovery member that recovers the release paper separated from the adhesive surface of the tape.

The tape providing member is a tape unwinder that unwinds the wound tape, the tape recovery member is a tape rewinder that rewinds the tape, and the release paper recovery member may be a release paper rewinder that rewinds the release paper.

The testing apparatus may further comprise: a tape separation member that separates a movement path of the tape from a movement path of the electrode so that the tape adhered to the electrode by the tape adhesive member can be detached.

The tape adhesive member may be a pressure roller.

The adhesive of the tape may be any one selected from the group comprising an acrylic-based adhesive and a silicone-based adhesive.

The tape adhesive member may press the tape and the electrode with a force having any one value selected from 1 kgf to 5 kgf for a time period selected from more than 0 second and 1 second or less.

The electrode may be a cylindrical jelly-roll type electrode assembly.

Advantageous Effects

According to the present disclosure, it is possible to quantify the testing of the degree of peeling of the electrode active material and reduce errors. In addition, since the testing of the degree of peeling of the electrode active material is performed with automated equipment, the production efficiency of the electrode assembly can be maximized and the quality of the produced electrode assembly can be improved.

Effects obtainable from the present disclosure are not limited to the effects mentioned above, and additional other effects not mentioned herein will be clearly understood from the description of the appended claims by those skilled in the art.

BRIEF DESCRIPTION OF THE DRAWINGS

FIGS. 1 to 4 show a method for testing the degree of peeling of an electrode active material according to the prior art;

FIG. 5 shows an apparatus for testing the degree of peeling of an electrode active material according to an embodiment of the present disclosure;

FIG. 6 shows an apparatus for testing the degree of peeling of an electrode active material according to another embodiment of the present disclosure;

FIG. 8 shows comparative experimental data results between a testing apparatus according to an embodiment of the present disclosure and a testing apparatus according to the prior art.

DETAILED DESCRIPTION

Figure 7:
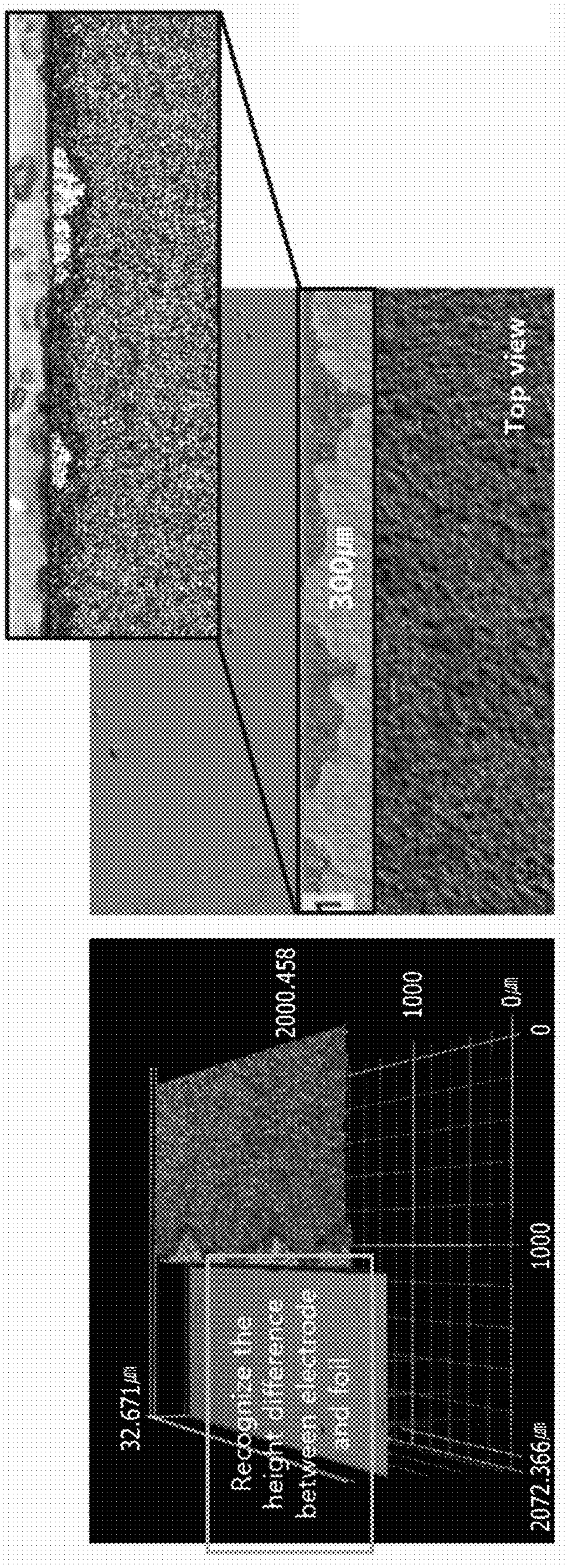
FIG. 7 shows an example of recognizing a peeling region by measuring the height difference (step difference) of electrodes in the testing apparatus of FIG. 5.

Hereinafter, various embodiments of the present disclosure will be described in detail with reference to the accompanying drawings so that those skilled in the art can easily carry out them. The present disclosure can be modified in various different ways, and is not limited to the embodiments set forth herein.

A description of portions that are irrelevant to the description will be omitted for clarity, and like reference numerals designate like elements throughout the description.

Further, since the size and thickness of each element shown in the accompanying drawing are arbitrarily illustrated for convenience of explanation, it would be obvious that the present disclosure is not necessarily limited to those illustrated in the drawings. In the drawings, the thickness are exaggerated for clearly expressing several layers and regions. In the drawings, for convenience of explanation, the thicknesses of some layer and regions are exaggerated.

Further, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, a certain part being located "above" or "on" a reference portion means the certain part being located above or below the reference portion and does not necessarily mean the certain part "above" or "on" toward an opposite direction of gravity.

Further, throughout the description, when a portion is referred to as "including" or "comprising" a certain component, it means that the portion can further include other components, without excluding the other components, unless otherwise stated.

Further, throughout the description, when it is referred to as "planar", it means when a target portion is viewed from the upper side, and when it is referred to as "cross-sectional", it means when a target portion is viewed from the side of a cross section cut vertically.

Now, an apparatus 100 for testing the degree of peeling of an electrode active material according to an embodiment of the present disclosure will be described with reference to FIG. 5.

The apparatus 100 for testing the degree of peeling of an electrode active material includes an electrode providing member (electrode unwinder) 110, an electrode recovery member (electrode rewinder) 120, a tape providing member (tape unwinder) 130, a release paper recovery member (release paper rewinder) 140, a table 150, a tape adhesive member 160, a tape recovery member (tape rewinder) 170, an electrode guide member 180, a tape separation member 190, and a testing unit 200. In addition, the apparatus may further include transfer rollers 210.

First, FIG. 5 shows and explains the electrode providing member 110 as the electrode unwinder 110, the electrode recovery member 120 as an electrode rewinder 120, the release paper recovery member 140 as a release paper rewinder 140, and the tape recovery member 170 as a tape rewinder 170, respectively, based on the roll shape, but the present disclosure is not limited thereto, and it is sufficient as long as it is capable of providing and recovering the electrode 10, the tape 20, and the release paper 30, respectively.

The electrode unwinder 110 unwinds a jelly roll manufactured and wound in the electrode manufacturing process, and provides the electrode 10 for testing the degree of peeling. At this time, the jelly roll may be provided by being wound, for example, after a slitting process, even in the electrode manufacturing process. The unwound electrode 10 moves through the transfer roller 210, and the like.

On the other hand, the tape 20 is unwound and provided from the tape unwinder 130. The tape 20 is attached to the electrode 10 and then removed, and provided to measure the degree of peeling of the electrode 10 as will be described later. The tape 20 and the release paper 30 attached to the adhesive surface of the tape 20 are wound together, and then unwound at the tape unwinder 130, and the release paper 30 is separated from the tape 20. The separated release paper 30 is immediately recovered (rewound) at the release paper rewinder 140.

The tape 20 is largely composed of an adhesive 21 and a film 22 that supports the adhesive component. A release paper 30 is attached to the adhesive surface and then separated as described above. The adhesive 21 is preferably an adhesive whose components do not remain on the surface of the electrode 10, even while it is attached to the electrode 10 and then separated to partially detach the electrode active material of the electrode 10. The adhesive 21 may be, for example, any one selected from the group comprising an acrylic-based adhesive and a silicone-based adhesive. The film 22 may be, for example, PET.

The tape 20 provided from the tape unwinder 130 and from which the release paper 30 is separated is moved to a tape adhesive member 160. In some cases, the movement of the tape 20 may be guided through the transfer roller 210 or the like. Since the tape 20 has a long and thin shape, phenomena may occur in which the tape 20 shifts sideways on the movement path during the movement process, or the angle of the tape is partially twisted. Therefore, the transfer roller 210 can correct the path of the tape 20 and the angle of the tape so that the tape 20 can accurately pass through the tape adhesive member 160 at a prescribed position. The transfer roller 210 may come into contact with the surface opposite to the adhesive surface of the tape 20 and guide the movement of the tape 20.

The tape 20 provided from the tape unwinder 130 and from which the release paper 30 is separated and the electrode 10 provided from the electrode unwinder 110 passes under the tape adhesive member 160. At this time, the active material layer of the electrode 10 and the adhesive surface of the tape 20 pass so as to face each other, and the tape adhesive member 160 presses the surface opposite to the adhesive surface of the tape 20. For effective pressing, a table 150 may be further provided, and at the electrode 10 and the tape 20 passing on the table 150, the tape adhesive member 160 presses the surface opposite to the adhesive surface of the tape 20. At this time, the foil of the electrode 10 passes in contact with the table 150. The speed at which the electrode 10 and the tape 20 travel may be, for example, 40 mm/min to 450 mm/min, or 300 mm/min. The tape adhesive member 160 presses the electrode 10 and the tape 20, for example, with a force of 1 kgf to 5 kgf or with a force of 2 kgf for a time period of more than 0 second and 1 second or less, or for 0.2 second. At this time, for example, the length of the region where the electrode 10 and the tape 20 are adhered is about 1 mm to 30 mm, and the width is about 20 mm to 70 mm. Alternatively, the length of the region to be adhered is about 15 mm, and the width is about 45 mm. However, the present disclosure is not limited to the above-mentioned values, and can be modified and changed in various ways in accordance with the environment to which an embodiment of the invention is applied.

When the tape 20 is adhered to the electrode 10 using the tape adhesive member 160 and then detached, peeling of the electrode 10 (more specifically, the electrode active material) is generated. On the other hand, if the tape 20 is adhered to the electrode 10 for a relatively long time and then detached, there is a risk that the upper end part of the active material layer of the electrode 10 may be detached by the adhesive. Since it may be detached only to the extent necessary to test the degree of peeling of the electrode 10, it is possible to minimize the area that is adhered by pressing the tape and the electrode as a pressure surface of the tape adhesive member 160, for example, as a round-shaped pressure surface. The tape adhesive member 160 may be a roller, for example, as shown in FIG. 5, but the present disclosure is not limited thereto and the shape or structure of the tape adhesive member 160 is not limited within the scope of achieving the above-described purpose. For example, they can be modified and changed in various ways, for example, the tape adhesive member 160 may not be a roller, but only the pressing surface may have a round shape, and the tape adhesive member 160 may have a rod shape with a narrow pressure surface.

Moreover, since the electrode 10 and the tape 20 only need to meet and contact each other at the position where they are pressed by the pressing surface of the tape adhesive member 160, it is possible to further include a guide member that allows the electrode 10 and the tape 20 to be separated and transported along their respective movement paths at the front and/or rear ends of the tape adhesive member 160. The embodiment of FIG. 5 further includes an electrode guide member 180 that guides the electrode 10 to the tape adhesive member 160. Moreover, it further includes a tape separation member 190 that separates the movement path of the tape 20 from the movement path of the electrode 10 so that the tape 20 attached to the electrode 10 by the tape adhesive member 160 can be immediately detached. The separated tape 20 is recovered (rewound) by the tape rewinder 170.

According to the embodiments of the present disclosure, when the tape 20 is adhered to the electrode 10 and then detached, the electrode 10 and the tape 20 are always adhered to each other at the same angle by the tape adhesive member 160, and pressed with the same pressure, and then separated from each other at the same angle. Further, due to additional components such as the electrode guide member 180 and the tape separation member 190, the adhesion angle and separation angle of the electrode 10 and the tape 20 can be more accurately maintained at a certain level. Thereby, when testing the degree of peeling of the active material of the electrode, which will be described later, the deviation can be greatly reduced. This serves to increase the accuracy and reliability of the peeling testing.

The electrode 10 in which peeling is induced is transported by a transfer member (transfer roller, etc.), and the surface of the electrode 10 in which peeling is induced is measured by the testing unit 200. The testing unit 200 may be, for example, a camera or a light sensor as a vision unit. The testing unit 200 measures the surface of the electrode 10 where the peeling is generated within a horizontal region of a certain length and a vertical region of a certain length (hereinafter referred to as "measurement region"). At this time, it is measured by increasing the magnification. For example, the surface of the electrode 10 can be measured at a magnification of 5 to 50 times, or at a magnification of 5 times. The testing unit 200 recognizes whether the surface of the electrode 10 is seceded by measuring differences in color or brightness, etc. or height differences (step difference) of the electrode.

More specifically, if the range of a preset chromaticity, a preset brightness, or a preset height difference (step difference) is exceeded, that is, if at least one of the chromaticity, brightness, and electrode height deviates from a preset value, it can be recognized as a region where the active material of the electrode 10 is seceded and the foil is exposed (hereinafter referred to as "peeling region").

If the height of the electrode 10 is smaller than a preset value, it can be recognized as a peeling region. By way of example, when the peeling region is recognized based on the height difference of the electrode 10, a region where the thickness of the active material after rolling is reduced to, for example, 60% or less can be recognized as a secession region. FIG. 7 shows an example of recognizing the peeling region through measurement of the height difference (step difference) of the electrode, in an apparatus 100 for testing the degree of peeling of an electrode active material according to the embodiment of FIG. 6. This is an illustrative example in which a pancake roll-shaped electrode 10 with a width of 20 mm to 90 mm and a thickness of 200 μm or less is provided in the form of a sheet, sucked to the table 150, and while moving the tape adhesive member 160 or the moving box 220 containing the tape adhesive member 160 at a speed of 300 mm/min, the tape 20 is adhered to the sheet-shaped electrode 10 and then detached to induce peeling. The tape 20 has a width of 25 mm and an adhesive force of 9 gf/cm. At this time, the photograph in FIG. 7 shows a case where the measurement width is 300 μm, and the enlarged photograph in FIG. 7 shows the screen observed at 5× magnification.

When the brightness of the surface of the electrode 10 is greater than a preset value, it can be recognized as a peeling region. By way of example, when the peeling region is recognized based on the brightness difference of the electrode 10, the region where the foil is exposed and the region where the active material is applied can be recognized based on the value of the light quantity received by the optical sensor of the testing unit 200. The region where the foil is exposed appears to have a light quantity of about 24,000 or more, while the region where the active material is applied appears to have a light quantity of about 8,000. The region where the foil is exposed (i.e., the peeling region) can be recognized by such a difference of the light quantity.

When the chromaticity of the surface of the electrode 10 falls within a preset value range, it can be recognized as a peeling region. By way of example, in the case where the peeling region is recognized based on the difference in chromaticity of the electrode 10, if the optical sensor recognizes, for example, a brass color, the corresponding portion may be recognized as a region where the foil is exposed (i.e., peeling region).

The testing unit 200 tests the degree of peeling based on the ratio of the peeling region to the measurement region. For example, the degree of peeling can be tested based on the ratio of the area of the peeling region to the area of the measurement region.

Further, the degree of peeling can be subdivided by setting the ratio of the peeling region to the measurement region into a plurality of sections. The ratio of the peeling region to the measurement region and the degree of peeling can be adjusted and stored in advance in a table. Meanwhile, the calculation of the ratio of the peeling region to the measurement region and the testing of the extent of peeling may be performed by a processor provided in the testing unit 200, or may also be performed by a remotely connected processor.

Further, the testing unit 200 can measure the chromaticity, brightness, step difference or the like of each sub-region by dividing the measurement region of the surface of the electrode 10 into the horizontal and vertical directions at regular intervals, that is, by dividing the regions into a plurality of grid-shaped sub-regions (e.g., dividing by (x, y) coordinates). For each sub-region, if the range of a preset chromaticity, a preset brightness, a preset step difference, or the like is exceeded as mentioned above, it is recognized (set) as a region where the peeling is generated (hereinafter referred to as a "peeling sub-region"). That is, if the chromaticity of the surface of the sub-region of the electrode is within the range of the preset value, or the brightness of the surface of the sub-region of the electrode is greater than a preset value, or the height of the sub-region of the electrode is smaller than a preset value, the sub-region can be set as a peeling sub-region. For more specific examples regarding the chromaticity, brightness, and step difference, refer to the examples mentioned above.

The degree of peeling can also be tested by dividing the number of sub-regions where such peeling is generated by the total number of sub-regions and calculating the ratio of the number of seceded sub-regions to the number of entire sub-regions.

The testing unit 100 may classify the degree of peeling of the electrode active material into, for example, pass, fail, suspending judgment, and the like, and can be implemented in a variety of ways, such as by expressing it as a numerical score or grading system. Additionally, by reducing the degree of peeling, the degree of process improvement can be expressed as a score.

The electrode 10 that has passed through the testing unit 200 is recovered (rewound) again by the electrode rewinder 120.

Next, an apparatus 100 for testing the degree of peeling of an electrode active material according to another embodiment of the present disclosure will be described with reference to FIG. 6.

In the embodiment of FIG. 6, the electrode 10 is placed in the form of a sheet on the table 150, and the apparatus 100 for testing the degree of peeling of an electrode active material moves to induce peeling of the electrode active material, and the degree of peeling is subsequently measured by the testing unit 200.

More specifically, the tape adhesive member 160 and the testing unit 200 of the apparatus 100 for testing the degree of peeling of an electrode active material according to the embodiment of FIG. 6 can move on the table 150. According to the movement of the tape adhesive member 160, a tape providing member (tape unwinder) 130, a release paper recovery member (release paper rewinder) 140, a tape adhesive member 160, a tape recovery member (tape rewinder) 170, and a tape separation member 190 can move together.

Further, a moving box 220 and a driving unit 230 may be further included to facilitate such movement. The tape providing member (tape unwinder) 130, the release paper recovery member (release paper rewinder) 140, the tape adhesive member 160, the tape recovery member (tape rewinder) 170, and the tape separation member 190 can be housed in the moving box 220. In addition, the testing unit 200 can be further housed. The transfer rollers 210 can be further housed if necessary.

The moving box 220 is moved along the table 150 (more specifically, on the electrode 10 seated on the table 150). The driving unit 230 is coupled to the moving box 220 and allows the moving box 220 to move. The driving unit 230 may be composed of a rail and a wheel **230*a* that moves along the rail, as shown in FIG. 6, but the present disclosure is not limited to those mentioned above, and it is sufficient as long as the moving box 220** can be moved in accordance with the environment in which an embodiment of the invention is implemented.

The table 150 may further include a suction member **150*a* on its upper surface. The suction member 150*a* is a gas suction type, and may be connected to a separate vacuum pump (not shown). The sheet-shaped electrode 10 may be sucked onto the suction member 150*a*. The suction member 150*a* may include at least one suction port. The suction ports may be provided in a plurality of numbers to cover a wider surface. When the suction member 150*a* starts the suction function through the suction port, the sheet-shaped electrode 10 is sucked onto the table 150. If necessary, the table 150 may further include a fixing member (not shown) that fixes both ends of the sheet-shaped electrode 10 in addition to the suction member 150*a***.

On the other hand, in the embodiment of FIG. 6, since the sheet-shaped electrode 10 is sucked onto the table 150, the electrode unwinder 110 and the electrode rewinder 120 do not need to be provided. Further, in some cases, the electrode guide member 180 may also be omitted.

When the sheet-shaped electrode 10 is sucked onto the table 150, the tape adhesive member 160 moves while pressing the sheet-shaped electrode 10, thereby inducing peeling of the active material of the electrode. The moving box 220 moves on the sheet-shaped electrode 10 along the sheet-shaped electrode 10 by the driving unit 230. As the moving box 220 moves, the tape 20 is pressed and adhered onto the sheet-shaped electrode 10 using the tape adhesive member 160 provided in the moving box 220, and the tape 20 is detached from the sheet-shaped electrode 10 using the tape separation member 190 provided in the moving box 220, thereby inducing peeling of the sheet-shaped electrode 10 (more specifically, the electrode active material).

Next, the testing unit 200 passes along the sheet-shaped electrode 10 from which the peeling is induced, and measures the surface of the electrode 10 from which the peeling is induced. The testing unit 200 can be modified and changed in various ways, for example, it may be provided at the rear end of the moving box 220, or provided separately from the moving box 220, and can move on the sheet-shaped electrode 10 following the moving box 220.

For other methods of measuring and testing the degree of peeling by the testing unit 200, refer to the explanation given above in the embodiment of FIG. 5. Further, during the operation of the tape unwinder 130, the release paper rewinder 140, the tape adhesive member 160, the tape rewinder 170, the tape separation member 190, the testing unit 200, and the transfer roller 210, since operation methods other than those mentioned above in FIG. 6 overlap with those mentioned above in the embodiment of FIG. 5, refer to the description of FIG. 5.

For reference, in the apparatus 100 for testing the degree of peeling of an electrode active material shown in FIG. 6, the tape adhesive member 160 and the testing unit 200 move on the sheet-shaped electrode 10, whereas in the apparatus 100 for testing the degree of peeling of an electrode active material shown in FIG. 5, a case where the electrode 10 moves below the tape adhesive member 160 and the testing unit 200 has been described.

However, the present disclosure is not limited to those mentioned above, and it is also possible that the tape adhesive member 160, the testing unit 200, and the electrode 10 do not move. Alternatively, an embodiment of the invention may be implemented in a manner that combines the embodiment of FIG. 5 and the embodiment of FIG. 6. For example, an embodiment of the invention can be implemented in various ways, for example, only one of the tape adhesive member 160, the testing unit 200, and the electrode 10 moves in accordance with the situation, or all of the tape adhesive member 160, the testing unit 200, and the electrode 10 move in opposite directions to each other. FIG. 8 shows comparative experimental data results between a testing apparatus according to an embodiment of the present disclosure and a testing apparatus according to the prior art. More specifically, the values of the degree of peeling measured from samples produced when electrodes of the same composition were slitted under different conditions are summarized in a graph.

As a comparative example, experimental data according to the prior art represents the number of jelly rolls in which 100 jelly rolls were disassembled, and peeling was generated with a width of 150 μm or more as a percentage. The x-axis of the graph in FIG. 8 represents each electrode sample generated when electrodes of the same composition were slitted under different conditions, and the y-axis represents the peeling rate (i.e., degree of peeling) of Example 1 and Comparative Example of the present disclosure. From FIG. 8, it can be seen that the peeling rate of the electrode in the conventional comparative example (more specifically, the linear analysis result of the comparative example) and the peeling rate (degree of peeling) of the electrode in Example 1 show a similar tendency.

In summary, according to the embodiments of the present disclosure mentioned above, errors can be reduced by quantifying the testing of the degree of peeling of the electrode active material. Further, since the testing of the degree of peeling of the electrode active material is performed with automated equipment, the production efficiency of the electrode assembly can be maximized and the quality of the produced electrode assembly can be improved.

Although preferred embodiments of the present disclosure have been described above, the scope of the present disclosure is not limited thereto, and various modifications and improvements can be made by those skilled in the art using the basic concept of the present disclosure as defined in the appended claims, which also fall within the scope of the present disclosure.

DESCRIPTION OF REFERENCE NUMERALS

10: electrode
20: tape
30: release paper
100: apparatus for testing the degree of peeling of an electrode active material
110: electrode unwinder
120: electrode rewinder
130: tape unwinder
140: release paper rewinder
150: table
160: tape adhesive member
170: tape rewinder
180: electrode guide member
190: tape separation member
200: testing unit
210: transfer roller
220: moving box
230: driving unit

The invention claimed is:

1. An apparatus for automatically testing a degree of peeling of an active material of an electrode, the apparatus comprising:

a tape providing member configured to provide a tape;

a tape adhesive member configured to press the tape so that the tape adheres to the electrode; and a testing unit configured to test the degree of peeling of the active material of the electrode, wherein the tape adhesive member is further configured to separate the electrode and the tape from each other, so as to peel off at least a portion of the active material, and wherein the apparatus is configured to convey the electrode along a traveling direction.

2. The testing apparatus according to claim 1, wherein:

the degree of peeling is based on a ratio of a peeling region to a measurement region, wherein the measurement region is a region of a surface of the electrode and has a predetermined horizontal length and a predetermined vertical length, and wherein peeling region is a region of the surface of the electrode where the electrode active material is configured to be peeled off and an electrode foil of the electrode is exposed.

3. The testing apparatus according to claim 2, wherein:

the testing unit is configured to test the degree of peeling based on a ratio of an area of the peeling region to an area of the measurement region.

4. The testing apparatus according to claim 2, wherein:

the measurement region includes a plurality of sub-regions divided at regular intervals in a horizontal direction and a vertical direction, respectively, wherein the plurality of sub-regions are in a grid shape, and wherein the testing unit is configured to identify the degree of peeling based on a ratio of a number of the plurality of sub-regions where the active material is peeled off to a total number of the plurality of sub-regions.

5. The testing apparatus according to claim 4, wherein: the testing unit is configured to identify a chromaticity, a brightness, or a height of a surface of the plurality of sub-regions of the electrode, respectively, and to determine that at least one of the plurality of sub-regions is a peeling sub-region, if the at least one of the plurality of sub-regions meet at least one of the following conditions: the chromaticity is within a range of a preset values, the brightness is greater than a preset value, and the height is smaller than a preset value.

6. The testing apparatus according to claim 1, wherein: the testing unit is configured to identify a chromaticity, a brightness, or a height of a surface of the electrode, respectively, and to determine that the electrode is a peeling region, if the electrode meets at least one of the following conditions: the chromaticity is within a range of a preset values, the brightness is greater than a preset value, and the height is smaller than a preset value.

7. The testing apparatus according to claim 1, wherein:
the testing unit is configured to calculates the degree of peeling of the electrode active material as a score or a grade.

8. The testing apparatus according to claim 1, further comprising:
a tape recovery member configured to recover the tape after the tape adhesive member along the traveling direction; and
a release paper recovery member configured to recover a release paper separated from an adhesive surface of the tape,
wherein the release paper is configured to separate from the adhesive surface of the tape when the tape is provided from the tape providing member.

9. The testing apparatus according to claim 8, wherein:
the tape providing member is a tape unwinder configured to unwind the tape,
the tape recovery member is a tape rewinder configured to rewind the tape, and
the release paper recovery member is a release paper rewinder configured to rewinds the release paper.

10. The testing apparatus according to claim 1, further comprising:
an electrode providing member configured to provide the electrode; and
an electrode recovery member configured to recover the electrode after the testing unit along the travelling direction.

11. The testing apparatus according to claim 10, wherein:
the electrode is a roll type electrode,
the electrode providing member is an electrode unwinder configured to unwind the electrode. and
the electrode recovery member is an electrode rewinder configured to rewind the electrode.

12. The testing apparatus according to claim 1, further comprising:
a table configured to accommodate and support the electrode,
wherein the electrode is a sheet type electrode,
wherein the tape adhesive member is configured to move while pressing a surface of the sheet-type electrode to thereby induce peeling of the active material of the electrode, and
wherein the testing unit is configured to test the degree of peeling of the active material of the electrode moving along the traveling direction.

13. The testing apparatus according to claim 12, further comprising:
a moving box accommodating the tape adhesive member and being configured to move along the electrode; and
a driving unit configured to moves the moving box,
wherein the testing unit:
is disposed on a rear end of the moving box and is configured to move along a portion of the electrode; or
is provided separately from and after the moving box along the traveling direction and is configured to move along the electrode.

14. The testing apparatus according to claim 12, wherein:
the table includes a suction member configured to suck the sheet-type electrode onto the table, and
wherein the suction member includes at least one suction port.

15. The testing apparatus according to claim 13, wherein:
the moving box further accommodates:
the tape providing member;
a tape recovery member configured to recover the tape after the tape adhesive member along the traveling direction; and
a release paper recovery member configured to recover a release paper separated from an adhesive surface of the tape.

16. The testing apparatus according to claim 15, wherein:
the tape providing member is a tape unwinder configured to unwind the tape,
the tape recovery member is a tape rewinder configured to rewind the tape, and
the release paper recovery member is a release paper rewinder configured to rewind the release paper.

17. The testing apparatus according to claim 1, further comprising:
a tape separation member configured to separate a movement path of the tape from the traveling direction of the electrode so that the tape adhered to the electrode by the tape adhesive member can be detached.

18. The testing apparatus according to claim 1, wherein:
the tape adhesive member is a pressure roller,
the tape adhesive member is configured to press the tape and the electrode with a force in a range of 1 kgf to 5 kgf for a time period in a range of more than 0 seconds and less than or equal to 1 second.

19. The testing apparatus according to claim 1, wherein:
an adhesive of the tape is any one selected from the group comprising an acrylic-based adhesive, or a silicone-based adhesive.

20. The testing apparatus according to claim 1, wherein:
the electrode is a cylindrical jelly-roll type electrode assembly.

* * * * *